US011328161B2

(12) United States Patent
Martin

(10) Patent No.: US 11,328,161 B2
(45) Date of Patent: *May 10, 2022

(54) SYSTEM FOR EVENT TIMING AND PHOTOGRAPHY WITH FOOT PLACEMENT RECOGNITION

(71) Applicant: Todd Martin, Christchurch (NZ)

(72) Inventor: Todd Martin, Christchurch (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,619

(22) Filed: Sep. 14, 2020

(65) Prior Publication Data
US 2020/0410243 A1  Dec. 31, 2020

Related U.S. Application Data

(63) Continuation of application No. 16/594,035, filed on Oct. 6, 2019, now Pat. No. 10,789,480, which is a continuation of application No. 15/101,926, filed as application No. PCT/US2014/067839 on Nov. 30, 2014, now Pat. No. 10,489,655.

(60) Provisional application No. 62/006,126, filed on May 31, 2014, provisional application No. 61/913,895, filed on Dec. 9, 2013.

(51) Int. Cl.
H04N 7/18       (2006.01)
G06K 9/00       (2022.01)
G06F 16/583     (2019.01)
G07C 1/24       (2006.01)
(52) U.S. Cl.
CPC ..... *G06K 9/00724* (2013.01); *G06F 16/5838* (2019.01); *G06F 16/5846* (2019.01); *G06F 16/5854* (2019.01); *G07C 1/24* (2013.01); *H04N 7/181* (2013.01)

(58) Field of Classification Search
CPC ............ G06K 9/00724; G06F 16/5838; G06F 16/5846; G06F 16/5854; H04N 7/181; G07C 1/24
USPC ......................................................... 348/157
See application file for complete search history.

(56) References Cited

U.S. PATENT DOCUMENTS

| 4,918,630 | A  | 4/1990 | Plouff       |
|-----------|----|--------|--------------|
| 6,545,705 | B1 | 4/2003 | Sigel et al. |
| 6,985,875 | B1 | 1/2006 | Wolf         |
| 9,330,467 | B2 | 5/2016 | Barrett      |
| 9,648,926 | B2 | 5/2017 | Marks        |

(Continued)

FOREIGN PATENT DOCUMENTS

| CN | 20840202 Y   | 11/2006 |
|----|--------------|---------|
| CN | 201270046 Y  | 7/2009  |

(Continued)

OTHER PUBLICATIONS

Supplementary European Search Report for EP 14869653 (dated Apr. 3, 2017).

(Continued)

*Primary Examiner* — Michael Lee
(74) *Attorney, Agent, or Firm* — Todd M. Martin

(57) ABSTRACT

A system for identifying and timing an athlete during a timed sporting event. The athlete is timed using image recognition technology in which one or more images of the athlete taken during the sporting event by a camera (106a, 106b, or 106c) is time-stamped to generate a finish time for the athlete. The athlete is identified by comparing one of the images taken during the sporting event with a profile image of the athlete.

16 Claims, 6 Drawing Sheets

(56) References Cited

U.S. PATENT DOCUMENTS

| | | | |
|---|---|---|---|
| 10,013,633 B1* | 7/2018 | Manmatha | G06F 16/583 |
| 10,016,941 B1 | 7/2018 | Beard | |
| 2002/0008622 A1 | 1/2002 | Weston | |
| 2005/0185834 A1 | 8/2005 | Kristjansson | |
| 2007/0011173 A1 | 1/2007 | Agostino | |
| 2009/0069909 A1* | 3/2009 | Rhein | G10L 19/018 |
| | | | 700/94 |
| 2009/0096871 A1 | 4/2009 | Kuwano et al. | |
| 2009/0141138 A1 | 6/2009 | DeAngelis | |
| 2009/0208113 A1* | 8/2009 | Bar | A43D 1/022 |
| | | | 382/199 |
| 2010/0158315 A1 | 6/2010 | Martin | |
| 2010/0191827 A1* | 7/2010 | Martin | G06Q 50/01 |
| | | | 709/217 |
| 2010/0225763 A1 | 9/2010 | Vock et al. | |
| 2010/0238271 A1 | 9/2010 | Pfeiffer | |
| 2012/0166091 A1* | 6/2012 | Kim | A61B 5/1038 |
| | | | 702/19 |
| 2012/0170427 A1 | 7/2012 | Saunders et al. | |
| 2012/0310389 A1 | 12/2012 | Martin | |
| 2013/0194427 A1 | 8/2013 | Hunter | |
| 2013/0235227 A1 | 9/2013 | Chang | |
| 2013/0307988 A1* | 11/2013 | Hansen | G06K 7/10425 |
| | | | 348/157 |
| 2013/0342699 A1* | 12/2013 | Hansen | H04N 7/188 |
| | | | 348/157 |
| 2014/0002663 A1 | 1/2014 | Garland | |
| 2014/0152833 A1 | 6/2014 | Itoi | |
| 2014/0172474 A1* | 6/2014 | Partridge | G06Q 10/02 |
| | | | 705/5 |
| 2014/0337434 A1* | 11/2014 | Hansen | H04L 12/1813 |
| | | | 709/204 |
| 2014/0354808 A1* | 12/2014 | Hansen | G06Q 50/10 |
| | | | 348/143 |
| 2015/0043776 A1 | 2/2015 | Barrett | |
| 2016/0035143 A1 | 2/2016 | Hansen | |
| 2016/0072633 A1 | 3/2016 | Hansen | |
| 2016/0072986 A1 | 3/2016 | Jones | |
| 2016/0349738 A1 | 12/2016 | Sisk | |
| 2017/0337221 A1* | 11/2017 | Park | G06F 16/5838 |
| 2020/0122024 A1* | 4/2020 | Miki | A63F 13/214 |

FOREIGN PATENT DOCUMENTS

| | | |
|---|---|---|
| CN | 201307301 Y | 9/2009 |
| DE | 10336447 | 3/2005 |
| DE | 102006006667 | 8/2007 |
| JP | 60262286 | 12/1985 |

OTHER PUBLICATIONS

Tech Talk—Not all tags are equal blog post dated Jul. 22, 2010; RFID Race Timing Systems; <https://rfidtimingsystems.com/2010/07/22/tech-talk-not-all-tags-are-equal/>.

Anthony Fowler, Declaration dated May 3, 2019.

"In Search of a UHF Multisport Tag That Works" blog postdated Nov. 16, 2011; RFID Race Timing Systems; <https://rfidtiming.com/2011/11/16/in-search-of-a-uhf-multisport-tag-that-works/>.

Johnston, James, "Work in Progress: RFID Sports Timing System" (2008), Senior_research Projects. 23. <https://knowledge.e.southern.edu/senior_research.23.>.

"Tech Talk—One tag Vs. Two?" blog post dated May 16, 2012; RFID Race Timing Systems; <https://rfidtiming.com/category/tech-talk>.

Decision of the Boards of Appeal for EP 14869653.7—Board of Appeal of the European Patent Office (Jul. 12, 2021).

* cited by examiner

SYSTEM FOR EVENT TIMING AND PHOTOGRAPHY WITH FOOT PLACEMENT RECOGNITION

CROSS REFERENCE TO RELATED APPLICATIONS

This application is a continuation of U.S. application Ser. No. 16/594,035, filed Oct. 6, 2019; which is a continuation of U.S. application Ser. No. 15/101,926, filed Jun. 5, 2016, now U.S. Pat. No. 10,489,655; and claims the benefit of the filing date of International Patent Application No. PCT/US2014/67839, filed Nov. 30, 2014, entitled "System and Method For Event Timing and Photography." International Patent Application No. PCT/US2014/67839 claims the benefit of: U.S. Application No. 62/006,125, filed May 31, 2014; and U.S. Application No. 61/913,895, filed Dec. 9, 2013; all of the above referenced applications are incorporated by reference herein in their entireties.

FIELD OF THE INVENTION

The present disclosure relates to improvements in systems for timing and photographing a participant in an athletic event.

BACKGROUND OF THE INVENTION

During an athletic event such as a marathon or a triathlon, a timing company will require a participant to wear a bib number in order to identify the participant at the finish line. Often times, the number becomes torn or obscured, particularly during triathlons, leading to a delay in results as unidentified individuals are identified through other means. Some systems rely on a timing chip to identify a participant and associate a finishing time with the participant, which is a dedicated chip for use with a race time system. The chip is typically worn by the athlete, or attached to the back of a bib number. Occasionally the timing chip becomes lost, for example, during the transition of a triathlon when an athlete is taking off their wetsuit. What is needed is a system and method that enhances the ability to identify participants in athletic events and lessen the problems associated with conventional systems.

SUMMARY

The present disclosure in one aspect sets forth a timing system which does not require the use of a bib number system or timing chip. In particular, in a preferred embodiment, the system may be utilised to time a participant using only the images of the participant captured at the start and the finish. This advantageously eliminates the need for bib numbers and/or timing chips, which can become cumbersome to use during the race, particularly in events such as triathlons where the participant is expected to swim prior to biking and running.

The present disclosure in another aspect sets forth a system for identifying and timing an athlete during a timed sporting event in which the athlete is participating. The system includes an image collection device for digitally capturing an image of an athlete. The system further preferably includes a media database for storing images captured by the image collection device. The system also preferably includes a processor configured to compare a profile image of the athlete stored in the media database with an image of the athlete captured during the sporting event and stored in the media database, the processor being configured to assign a time with the athlete's performance in the sporting event based on the comparison between the profile image and the image captured during the sporting event.

In another preferred aspect, the present disclosure sets forth a system for matching unpublished media content created by a third party at an athletic event with a participant in the event. The system preferably includes an electronic database for maintaining a plurality of user profiles of users registered to access the database, each user profile including a profile image of the user. The system further preferably includes a processor configured to receive the unpublished media content created at the athletic event, compare the unpublished images from the athletic event with the profile images of the registered users maintained by the database, and generate a match list of participants whose images appear in the unpublished media content created at the athletic event and who are registered users.

The processor may be configured to send the match list to the third party, and receive from the third party at least one link linking a matched registered user with the digital image showing the registered user's image. The processor may be configured to permit a registered user access to the digital images if the registered user is listed on the match list. The listing of participants may include a link for each listed participant to the digital images, each link being tagged with data identifying the participant. The digital image may consist of one or more photographs of the participant. The processor may be configured to send an electronic communication to a registered user to notify the registered user that the digital image showing the registered user's image is available for viewing by the registered user, the electronic communication being sent to the registered user based on contact details stored in the user profile. The processor may be configured to direct a registered user who appears on the match list to a payment gateway so that the registered user may purchase the digital image tagged with the registered user. Each user profile may be configured to maintain digital images purchased by the registered user associated with the user profile.

In another preferred aspect, the present disclosure sets forth a method for matching unpublished digital images created by a third party at an athletic event with a participant in the event. The method includes storing a profile image of a user in a user profile stored on an electronic database; receiving a plurality of unpublished digital images created by the third party at the athletic event, each unpublished image including at least one participant in the athletic event; and determining, with a processor, whether the participant in the unpublished image is the user by comparing the profile image of the user with the participant in the unpublished image.

The determination may be made using facial recognition technology. The method may further include generating a list of registered users who participated in the athletic event where the unpublished digital images were created, and comparing the profile images of the registered users on the generated list with the unpublished images created at the athletic event to determine whether the participant in the unpublished image is the user. The determination may be made without using a bib number. The determination may be made only using facial recognition technology. The method may further include sending a communication to a registered user who has been identified as a participant in at least one of the unpublished images, the communication including a link to a payment gateway. The method may further include providing the registered user who has been identified as a participant in at least one of the unpublished images an opportunity to purchase the image online.

As used herein, "configured" includes creating, changing, or modifying a program on a computer or network of computers so that the computer or network of computers behave according to a set of instructions. The programming to accomplish the various embodiments described herein will be apparent to a person of ordinary skill in the art after reviewing the present specification, and for simplicity, is not detailed herein. The programming may be stored on a computer readable medium, such as, but not limited to, a non-transitory computer readable storage medium (for example, hard disk, RAM, ROM, CD-ROM, USB memory stick, or other physical device), and/or the Cloud.

It will be appreciated that in one or more embodiments, the system may include one or more work stations at a back end for use by a platform operator, one or more local client computers for access by users, and a communications network that facilitates communication between the platform, the work stations at the back end, and the client computers. Preferably, the work stations and client computers will include a display and means for entering information, such as a Graphic User Interface (GUI), a keyboard and/or voice activated data entry. Means for accessing the platform by users may include, but is not limited to personal computers and mobile devices such as tablets and smartphones, and other user devices capable of communicating over a communications network utilizing the Internet.

As used herein, a third party is a person or business entity (e.g., company or sole proprietorship) that provides content on a commercial basis. It will be understood that the term "during" when used to describe the participation of an athlete or user in a race, competition and/or sporting event includes the time from the start up to and including the finish of the athlete or user in the race, competition or sporting event, unless that athlete or user drops out (does not finish). Races, competitions and/or sporting events may include, but are not limited to, running races, bike races, swim meets, triathlons, duathlons and other competitions pitting an individual or team against other individuals or teams. Unpublished images or media content includes images not released for general publication by a media content provider (e.g., person or business entity supplying digital images on a commercial basis). For example only, images may be in an unpublished state by keeping the images inaccessible to non-commercial entities or people, for example, by having a closed database of images not accessible over the internet.

It is to be understood that both the foregoing general description and the following detailed description are exemplary and explanatory only and are not restrictive of the invention, as claimed, unless otherwise stated. In the present specification and claims, the word "comprising" and its derivatives including "comprises" and "comprise" include each of the stated integers, but does not exclude the inclusion of one or more further integers. The claims as filed with this application are hereby incorporated by reference in the description.

The accompanying drawings, which are incorporated in and constitute a part of this specification, illustrate several embodiments of the invention and together with the description, serve to explain the principles of one or more forms of the invention.

DETAILED DESCRIPTION OF THE DRAWINGS

Reference will now be made in detail to exemplary embodiments of the invention, some of which are illustrated in the accompanying drawings.

Figure 1:
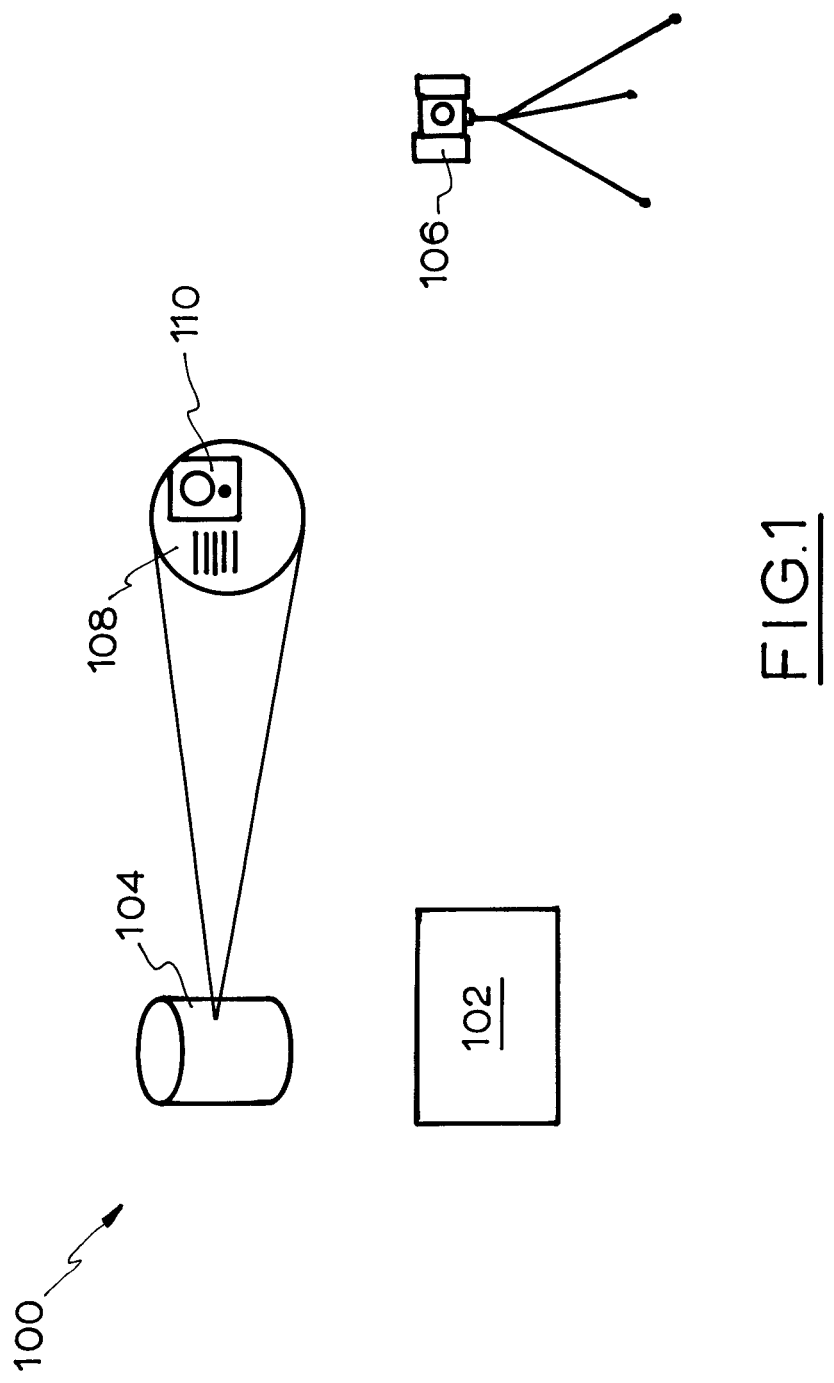
FIG. 1 is a diagram of system components in accordance with an embodiment of the disclosure.
Figure 2:
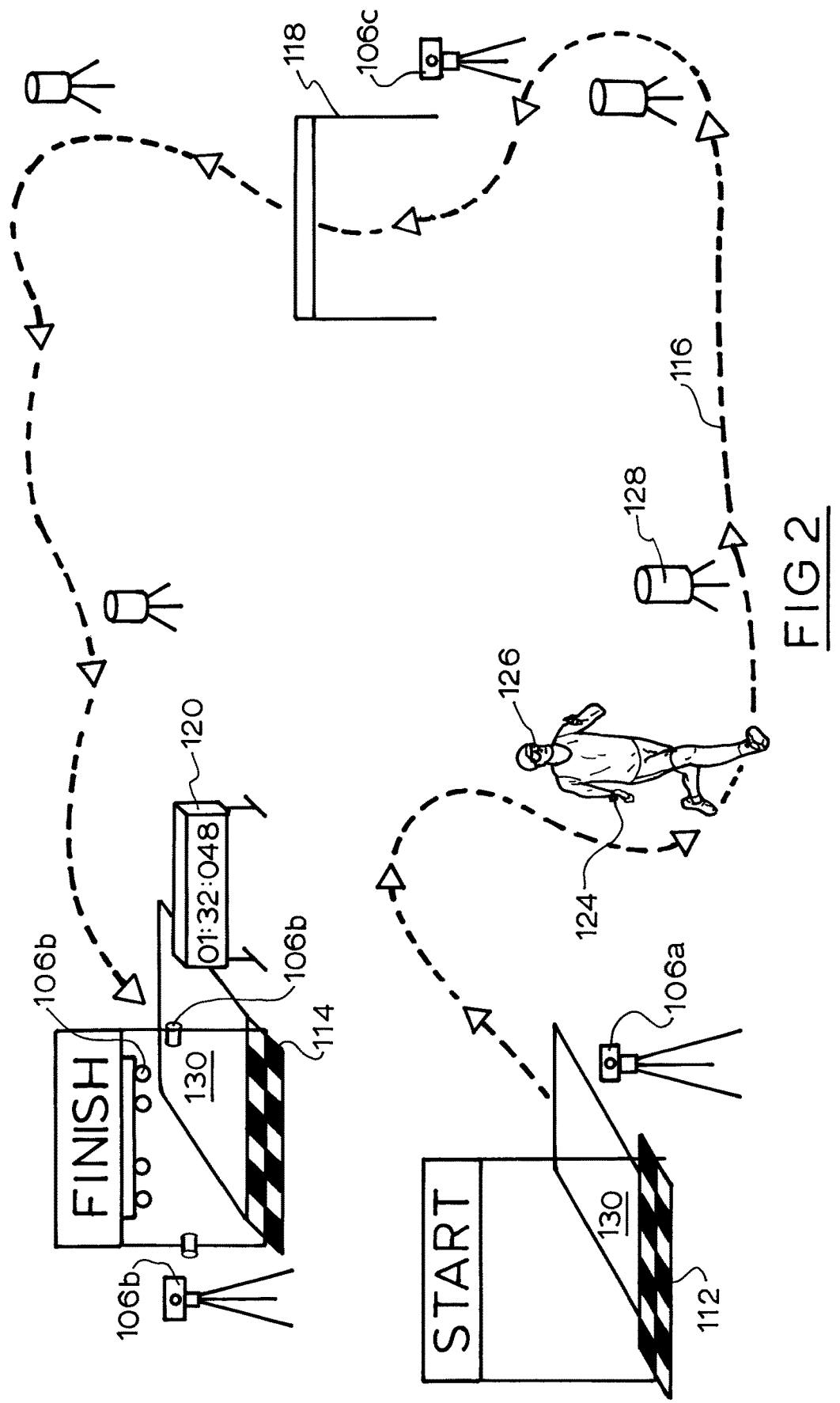
FIG. 2 is a pictorial view of the system of FIG. 1 shown along a race course of a sporting event.
Figure 3:
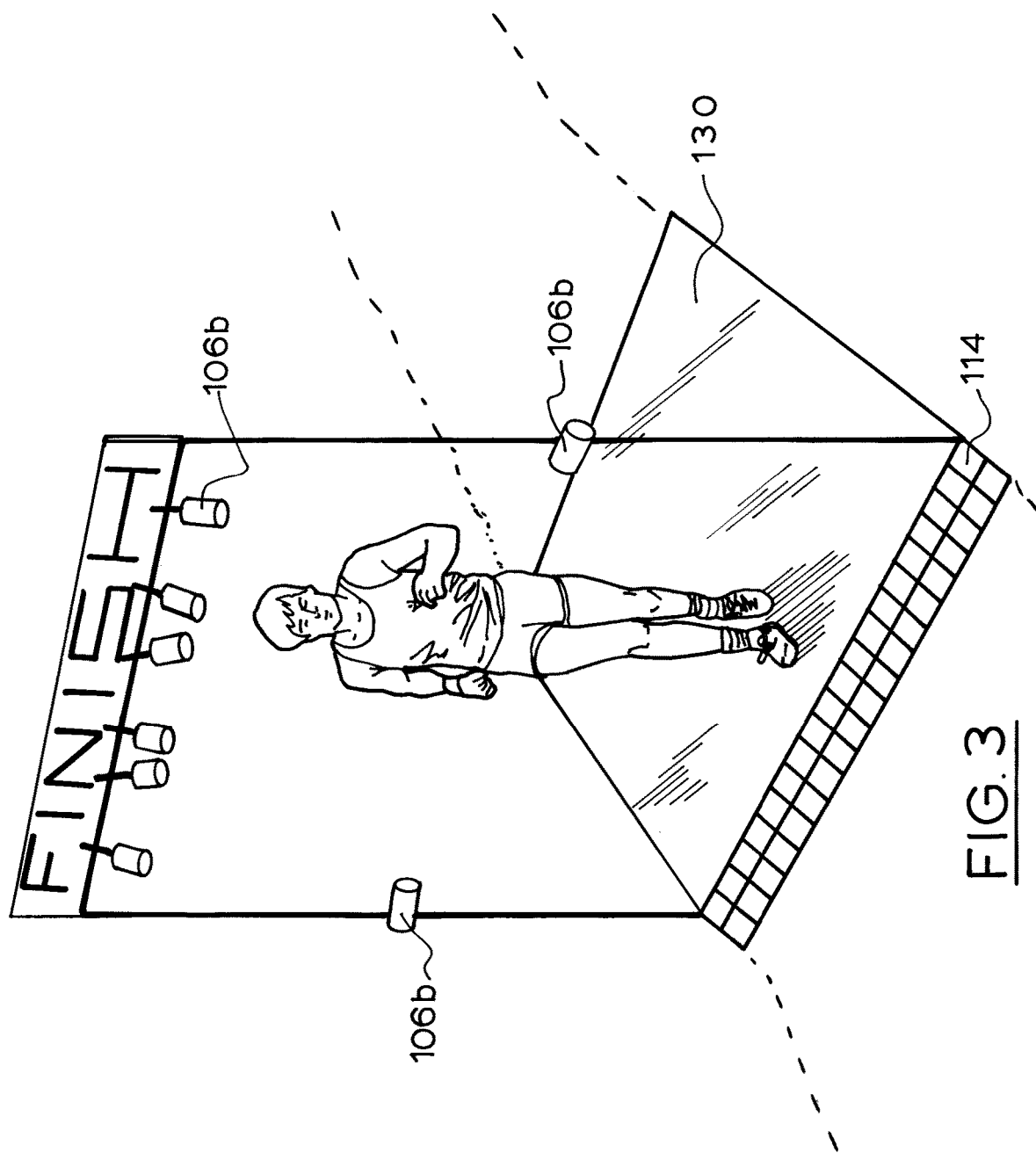
FIG. 3 is a pictorial view of an athlete crossing the finish of the race course of FIG. 2.
Figure 4:
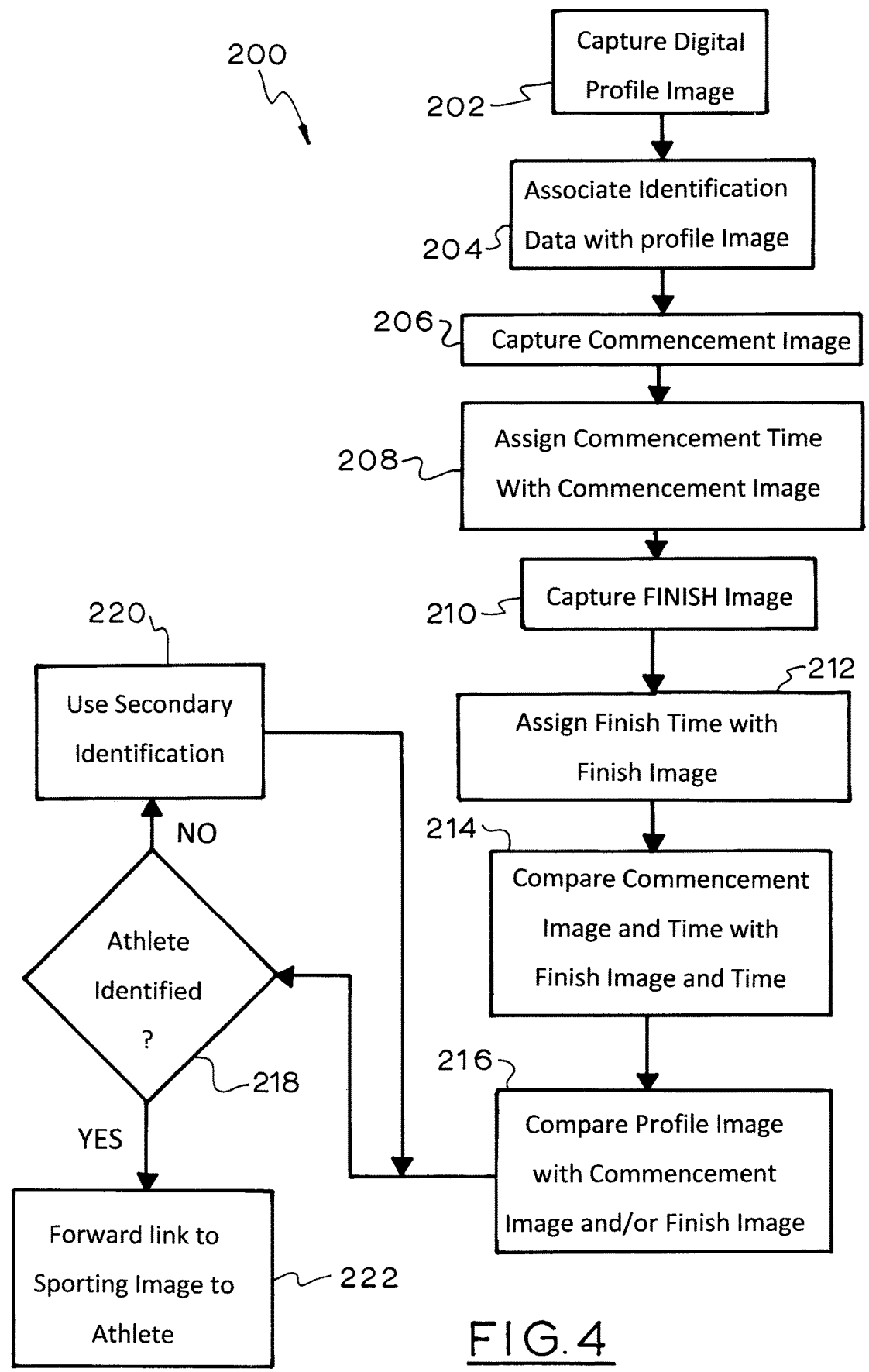
FIG. 4 is a flow diagram of a method for timing an athlete in accordance with an embodiment of the disclosure.

FIGS. 1 to 3 show a preferred embodiment of a system 100 having a processor 102, an electronic database 104, and at least one digital image collection device 106. In use, a digital profile image of a user is captured and stored in electronic database 104. The user participates in a sporting event, such as a running race, and has a commencement image captured by digital image collection device 106. As the user is finishing, a finish image is captured by another digital image collection device 106. The images captured during the sporting event are compared with the profile image to identify the participant in the images from the sporting event as that of the user. The commencement and finish images are preferably time stamped so that the user's time is determined by a comparison of the commencement and finish images. The preferred elements of system 100 and their interrelationship are described below.

Referring to FIG. 1, system 100 is preferably a standalone system which may be in communication with the internet if desired. Processor 102 may be in the form of a microcomputer such as a laptop computer. Processor 102 preferably includes a microchip, such as a System on Chip (SoC), with appropriate control circuitry. Processor 102 preferably includes image recognition technology so that images may be compared with each other to ascertain a match. More preferably, processor 102 includes facial recognition technology for comparing facial images of individuals. Examples of suitable recognition algorithms include 3-D modelling, geometric and/or photometric approaches, linear discriminate analysis (LDA), system vector machine (SVM), pattern matching, dynamic link matching, and/or elastic bunch graph matching. The details of image recognition technology would be appreciated by those of ordinary skill in the art and are therefore not repeated here for simplicity.

Electronic database 104 is preferably configured with a plurality of user profiles 108 with fields for user identification data such as name, address and contact details (electronic and telephone). Each user profile 108 preferably includes a provision for a digital profile image 110 for association with each user.

System 100 further preferably includes at least one digital image collection device 106. Digital image collection device 106 may be any device configured to capture a digital image, such as, but not limited to a camera, for example, a standalone digital camera, or a video camera; a device having an integrated or component camera, such as a tablet computer, a laptop computer, or a mobile communications device such as a smartphone. Digital images captured by the digital image collection device may be stored on a computer-readable storage medium associated with processor 102 (for example, hard disk, server, Cloud); and/or a computer-readable storage medium associated with the digital image collection device; and/or a separate, transferable computer-readable storage medium (for example, flash drive (USB) or disc). Images may include static images or frames from a video.

Digital image collection device 106 may be adapted for depth-detection and may include a laser and/or a 3-D rangefinder to facilitate depth detection.

In use, a user registers for a sporting event such as a triathlon. The registration may be in person or over the internet. If in person, the user provides their identification data and a digital image is captured of the user while at the registration area. The user's identification data and digital profile image are loaded into database 104.

Alternatively, the user may register for a sporting event using an online registration platform. In this situation, the user provides their identity data into predefined fields and uploads a profile picture to database 104. The user may make a payment as part of the registration process. Once the user has established their profile on database 104, the user may attend and compete in the sporting event.

Referring to FIG. 2, at the sporting event, a digital image collection device 106a is preferably positioned adjacent or nearby a starting line 112. At least a second digital image collection device 106b is preferably positioned adjacent or nearby a finish line 114. A third digital image collection device 106c may be positioned somewhere intermediate the start and the finish if desired. In use, the user commences the race and crosses starting line 112. Digital image collection device 106a captures a digital image of the user and preferably assigns or associates a time with the image, for example, by time-stamping the image. The time may be time of day or over-all race time. While traversing race course 116, the user may be directed through a photo zone 118 so that another digital image may be captured using digital image collection device 106c. A split time may be assigned with the image if desired. As the user crosses the finishing line, digital image collection device 106b preferably captures a finish image of the user, which is assigned or time-stamped with a finish time by either image capture device 106 or processor 102. The finish time may be the same as that shown or displayed on race time clock 120 (preferably managed by a timing company), or may be a time of day.

With continued reference to FIG. 2, system 100 may be configured to identify and track a wearable device on the athlete so that as the athlete participates in the sporting event, the system will track the athlete's position along the course. Examples of wearable devices include, but are not limited to, a timing chip, a smartphone, a watch 124, a device insertable in a shoe, and eyewear 126. Watch 124 may include GPS circuitry and/or a wireless radio transmitter for network Wi-Fi communications and/or peer-to-peer communications, as will be further described below. Where the user elects to use their own device (and not a timing chip provided by a timing company), they may register the device (e.g., provide the device identification to the timing company) prior to commencement of the sporting event. Thereafter, a communications interface forming part of the system may be used to collect data via a communications means such as satellite, cellular technology, NFC, WLAN, and/or peer-to-peer communications (e.g., Bluetooth and/or Wi-Fi Direct) from the athlete as the athlete moves along the course. The athlete's participation data may be directly uploaded into the system from the athlete's own personal device. Where the wearable device utilises a peer-to-peer technology such as Bluetooth and/or Wi-Fi Direct, sensors 128 with appropriately configured transceivers may be positioned along the course as appropriate for the communications range of such devices. Examples of suitable sensors include Bluetooth beacons. The details of Bluetooth beacons would be appreciated by those of ordinary skill in the art and are therefore not repeated here for simplicity.

If desired, a secondary means of identification may be used to identify an athlete. For example, system 100 may include a digital foot recognition mat 130 configured to capture an image of the bottom of an athlete's shoe for comparison with an image stored on database 104. The bottom of a shoe, unless brand new, will show the wear pattern of an athlete. Mat 130 preferably contains a sensor network which is adapted to capture images of multiple athletes as they step on the mat. The tread pattern of the particular brand of shoe, combined with the wear pattern of the wearer, provides a reasonably reliable means of identification of the athlete wearing the shoe. Other secondary identification means may include a registered personal device (e.g., watch, smartphone, eyewear, etc.) such as described above, a timing chip, and/or race number.

Referring to FIG. 3, image collection devices 106 may be arranged in a variety of positions to optimally capture an athlete's image. For example, a series of alternating cameras 106b may be positioned along an elevated or overhead position at or proximate finish 114 to capture forward, overhead and/or rear perspective views of an athlete approaching and crossing the finish. Additional cameras may be positioned medially and/or laterally (left and/or right) of the finish, and/or forward of the finish. It will be understood that similar camera arrangements may be used at the start or at any place along a course where the athlete travels.

It will be appreciated that it is not always practical to position an image collection device directly in the path of an oncoming athlete. Processor 102 may be configured with one or more recognition algorithms suitable for side, or angled side profiles. Such algorithms may be modified to compare the distance between a point on the ear (e.g., concha or lobule) and a point on the eye (e.g., iris), and/or the distance between a point on the ear and a point on a nose (e.g., tip), and/or a ratio comparing the distance between a point on the ear and eye and the distance between a point on the ear and the nose. Where opposed cameras are used to capture left side, right side and/or oblique profiles of the athlete, the images captured by each camera may either be individually analyzed, or more preferably, merged to generate a composite image which is analyzed.

Where multiple image collection devices are utilized, the image collection devices may be adapted to form a wired or wireless peer-to-peer network with each other and/or with processor 102. For example, each camera 106b shown in FIG. 3 may include a radio transceiver configured for Bluetooth and/or Wi-Fi Direct communications with other cameras and/or processor 102.

The user's total race time may be determined by comparing the commencement image with the finish image and comparing the times associated with each image (i.e., subtracting the commencement time from the finish time of the user). Each participant may be identified by comparing at least one of the sporting event images with a profile image using image recognition technology. Preferably the determination is conducted without the use of bib numbers or timing chips. More preferably, the identification is made using solely the images of the athlete. Most preferably, the images are matched with users using facial recognition technology, the details of which would be appreciated by those of ordinary skill in the art. If desired, more than one category of features may be used as part of the image recognition process. For example, facial features and at least one non-facial feature may be used to identify a user in a digital image captured during the sporting event. For example, a portion of an article of clothing may be used in combination with a facial feature to assist in identifying a user as a participant.

Other personal features may be used to identify an athlete in instances where the face may be partially or totally obscured. For example, head dimensions (for example, the distance between the ears), the distance between the ends of the shoulders, and/or general body shape (for example, torso width and/or body height) may be used to help identify an athlete.

Having described the preferred components of system 100, a preferred method 200 for timing an athlete participating in a sporting event will now be described with reference to FIGS. 1 to 4. The method preferably includes the step 202 of capturing a digital profile image of the athlete prior to commencement of the sporting event with an image collection device such as a camera. Step 204 includes associating or matching, with a processor, identity data of the athlete with the athlete's profile image. Examples of identity data include, but are not limited to, name and/or contact details such as address, phone number and/or social media account information. The association or matching may be performed by the athlete prior to the commencement of the sporting event. Step 206 includes capturing, with an image collection device, a digital commencement image of the athlete as the athlete commences the sporting event. For example, referring to FIG. 2, as the athlete crosses starting line 112, camera 106a captures an image of the athlete. Step 208 includes assigning a commencement time with athlete's commencement image, for example, by time-stamping or tagging the image. Step 210 includes capturing, with an image collection device, a digital finish image of the athlete as the athlete finishes the sporting event. For example, referring to FIGS. 2 and 3, as the athlete crosses finish line 114, one or more of cameras 106b capture an image of the athlete. Step 212 includes assigning a finish time with the athlete's finish image, for example, by time-stamping or tagging the image. Step 214 includes determining the athlete's race time by comparing, with a processor, the commencement image and commencement time of the athlete with the finish image and finish time of the athlete, and subtracting the commencement time from the athlete's finish time. For example, commencement time from the time stamp associated with the commencement image may be subtracted from the finish time from the time stamp associated with the finish image to obtain the athlete's race time. Step 216 includes identifying the athlete by comparing, with a processor, the profile image of the athlete with at least one of the athlete's commencement and finish images. Preferably the step of identifying is conducted without the use of any timing chip or race number bib. Preferably, the step of identifying is conducted using only image recognition. In step 218, it is determined whether the athlete in a captured image has been identified. If the athlete has not been identified, then in step 220, one or more secondary methods of identification are used to identify the athlete. Examples of secondary methods include the use of a chip or race number (if worn), the use of a device which has been registered with the system such as a smartwatch, bracelet and/or eyewear, and/or use of mat 130 as described above. If the athlete is identified, then the method further includes forwarding at least one of the images captured during the sporting event to the athlete identified in the image over a communications network. The method further preferably includes step 222 of forwarding a link to the athlete identified in one of the images captured during the sporting event and providing the athlete with an opportunity to purchase at least one image of the athlete identified in the image. The method further preferably includes storing a purchased image of the athlete in an online database selectively accessible by the athlete.

It will be appreciated that the steps described above may be performed in a different order, varied, or some steps added or omitted entirely without departing from the scope of the disclosure. For example, where a secondary identification method is utilized, the athlete may be asked to register their own personal device (e.g., watch, eyewear, smartphone, bracelet) with the system prior to commencement of the competition. The athlete may, for example, pre-register a device identification using a remote terminal over the internet with the system, and/or register the device onsite by using the on-board communications of the device to register with an appropriate system interface, using, for example, Near Field Communications (NFC), WLAN, Bluetooth and/or Wi-Fi Direct. In a preferred embodiment, a wearable device relying on RFID technology for device identification is expressly excluded. Instead of using an athlete's particular commencement time in the determination of the athlete's race time, the commencement time may be assigned a default value of zero so that the athlete's race time is the actual race clock time (i.e., the over-all race time). This may be suitable where the number of participants is small.

In another preferred embodiment, system 100 may form part of a web platform accessible over a communications network by one or more client computers and/or mobile devices, such as laptops, tablets, smartphones, and/or wearable smart device. Electronic database 104 may be configured to preferably maintain and store a plurality of user profiles 108 that may be populated by users over the internet. Each user profile 108 preferably includes identification data and a profile image 110 of the user preferably uploaded to the platform by the user.

Figure 5:
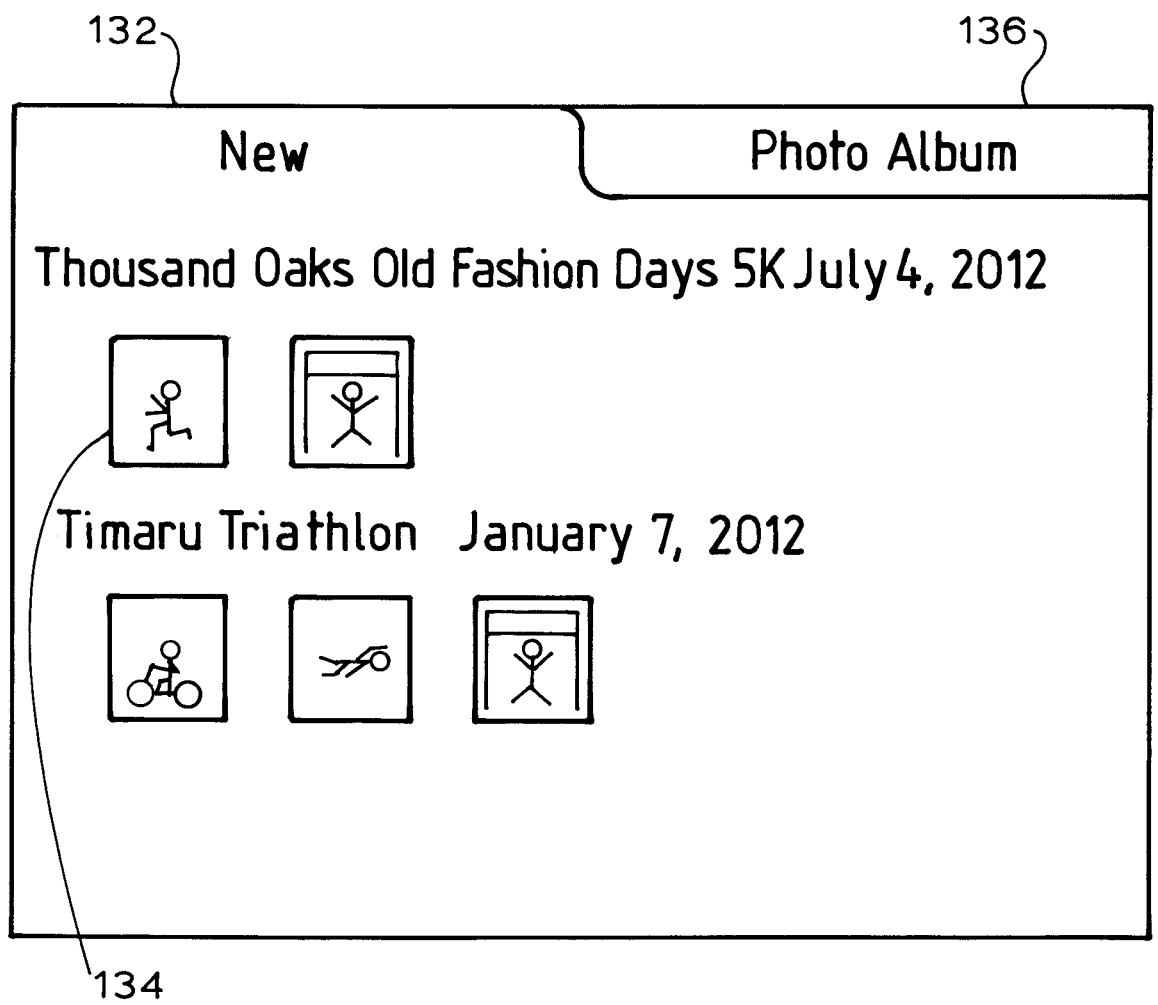
FIG. 5 is a preferred embodiment of a graphical user interface for use in generating a media portal permitting a user to access and purchase media content.
Figure 6:
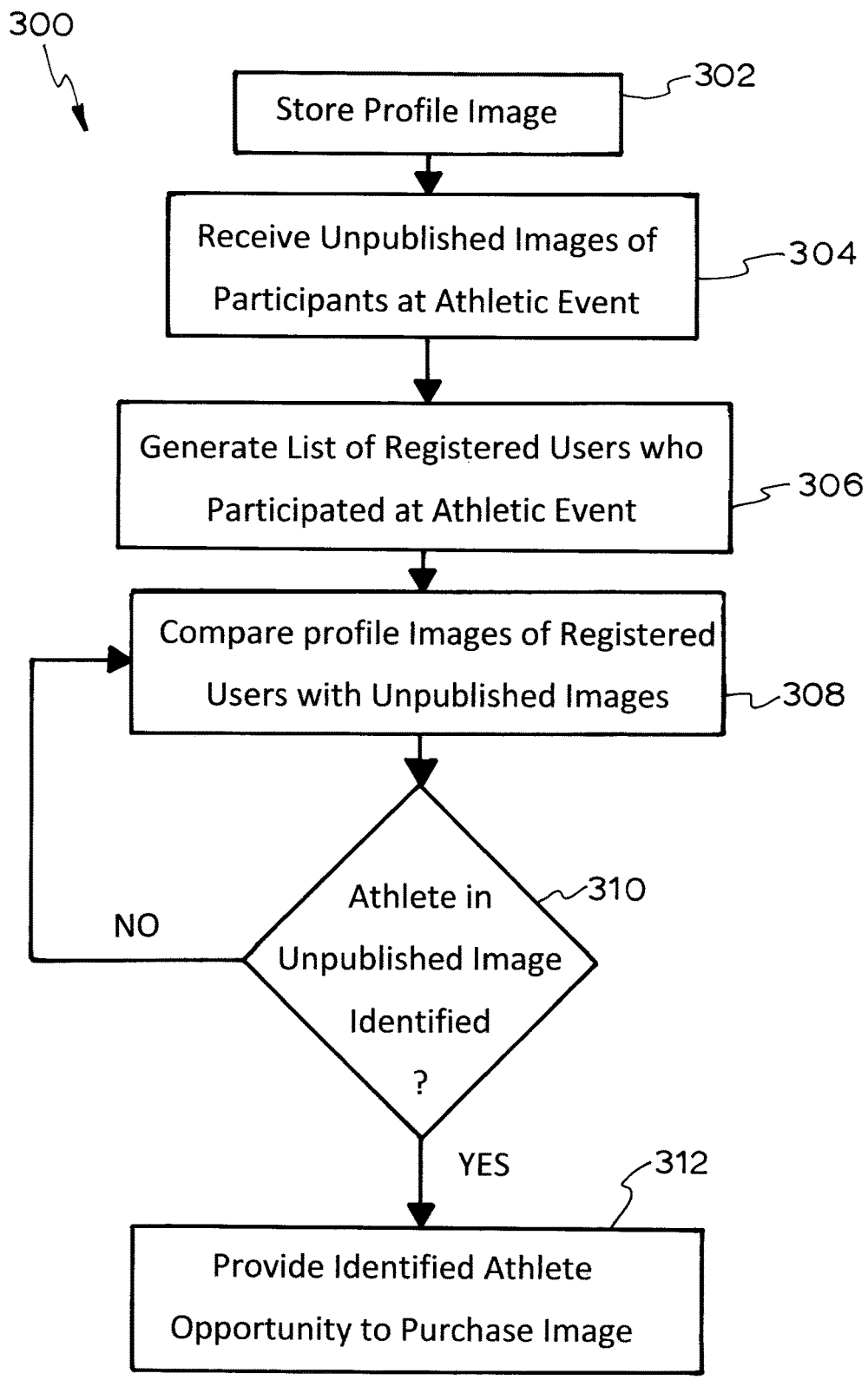
FIG. 6 is a flow diagram of a method for matching unpublished images created by a third party at an athletic event with a participant in the event in accordance with an embodiment of the disclosure.

Referring to FIGS. 1 and 5, the platform may be configured to permit media content providers to upload to electronic database 104 media specific to a registered user, which the registered user may access once logged into the platform. For example, a third party, such as a photographic company, may upload pictures taken of the registered user during one of the competitions in which the registered user participated. Preferably, the pictures or photos are tagged (associated) with the individual or individuals in the photo. Photos may be tagged, for example, by noting a race number or other identifier worn by the person in the photo, obtaining personal or contact details recorded with the race number, and matching the person in the photo with the personal or contact details corresponding to the race number. Photos may also be tagged (associated) with the individual or individuals in the photo by facial recognition, and matching an image taken during an athletic event with an athlete's previously stored personal profile image. The uploaded photo is preferably initially a "thumbnail" photo 134 (with embedded link) to the source or website of the entity providing the photo.

Matching a registered user of the platform with their photo is preferably by competition; user name; area, postal, or zip code; and age, preferably in that order. In particular, the photo company would forward a listing to the platform of participants for a particular race where the company took photos. Processor 102 compares the list provided by the photo company against the listing of register users of the platform. Positive matches are identified and a match list is created and forwarded to the photo company. The photo company then provides the thumbnail photos and/or links for the positive matches to the platform, and those are associated with the registered users and/or subscribers using the record identifiers of the registered users and/or subscribers.

Subsequently, the registered user may log into the platform and access the photos. The registered user may click on the "new" tab 132 and see a collection of their photos from different races. If the registered user and/or subscriber desires to purchase the photo, they may select the image and/or link and go to the photo company's website to make the transaction. The selection may be made by clicking or otherwise interacting with the image and/or link. Once purchased, the user may transfer and/or download the photo to their digital photo album (under the "photo album" tab 136). The media may be organized by registered user, date and competition.

It will be appreciated that images other than thumbnail photos may be used, including icons or symbols. Preferably, the thumbnail photos are copy-protected so that the registered user cannot copy without first purchasing them. If desired, the thumbnail image may be "unlocked" to permit the user to transfer it to the user's digital photo album. Alternatively, once purchased, the photo may be downloaded from the photo company. In a preferred embodiment, the media available for purchase is limited only to photos taken of the registered user during a competition in which the registered user participated. In other situations, a photo company might associate a video clip with a registered user.

If desired, any commercial transaction to purchase the media may be conducted by the platform. For example, if a user is interested in purchasing media content in which their image appears, the user may access a link associated with the thumbnail image of interest. The activated link will bring the user to a page where the user may order the media. Thereafter, the user may select a delivery option, such as e-mailing the media content to the user's e-mail account, or transferring the media content to a limited access area associated with the user's account on the platform, such as photo album 136 in FIG. 5.

It will be appreciated that the media portal described above may be configured in a variety of ways. For example, instead of sending a match list to a third party media content provider, third party media content providers may send the media content, or a link to media content locally stored by the third party, to the platform, which will accept tagged media content or links which match users registered on the platform and reject tagged media content or links that do not match users registered on the platform.

There are times when a third party media content provider has images of unknown participants, either because a participant's race bib number is torn, missing or obscured. Processor 102 may be configured to receive unpublished media content or images created at the athletic event by the media content provider, compare the unpublished images from the athletic event with the profile images of the registered users maintained by the database, and generate a match list of participants whose images appear in the unpublished media content created at the athletic event and who are registered users. Thus, third party media content providers may identify a participant and generate a purchasing opportunity where otherwise the image may have gone to waste for lack of any identification of the participant.

A method for matching unpublished digital images created by a third party at an athletic event with a participant in the event preferably includes the step 302 of storing a profile image of a user in a user profile on an electronic database. In step 304, a plurality of unpublished digital images created by the third party at the athletic event, each unpublished image including at least one participant in the athletic event, are received at the web platform. Thereafter, it is determined, using processor 102, whether the participant in the unpublished image is the user by comparing the profile image of the user with the participant in the unpublished image. The determination is preferably made using facial recognition technology. In step 306, a list is generated of registered users who participated in the athletic event where the unpublished digital images were created. In step 308, the profile images of the registered users on the generated list are compared, using processor 102, with the unpublished images created at the athletic event to determine whether the participant in the unpublished image is the user. In step 310, it is determined, using processor 102, whether the athlete in the unpublished image has been identified. The determination is preferably made without using a bib number. The determination is preferably made only using facial recognition. If the athlete has not been identified, then the unpublished image is compared with one or more additional profile images until a match is made, or until there are no more profile images for comparison. If the athlete in the unpublished image is identified and is a registered user, then in step 312, the registered user who has been identified as a participant in at least one of the unpublished images is provided with an opportunity to purchase the image online. For example, a communication is sent to the registered user who has been identified as a participant in at least one of the unpublished images, the communication including a link to a payment gateway.

It will be appreciated that the steps described above may be performed in a different order, varied, or some steps added or omitted entirely without departing from the scope of the disclosure. For example, where an athlete has not been identified using a profile image stored in a database that is part of the web platform, a search may be conducted on the internet for images matching the athlete in the unpublished image. Positive matches may then be used to identify the athlete in the unpublished image.

System 100 may be configured to automatically provide an athlete with their participation images as well as using images to time the athlete. For example, referring to FIG. 2, device 128 may be configured to operate as a beacon. As the athlete approaches device 128, the athlete's wearable device detects a signal transmitted by a transmitter on device 128. The athlete's wearable device then signals a communications hub having a transceiver and microprocessor at photo zone 118, which initiates an image capturing process by alerting camera 106c of the approach of the athlete. Camera 106c captures the image of the athlete as the athlete passes through photo zone 118. The image captured by camera 106c is then uploaded to one or more of processor 102, the athlete's wearable device (if equipped with a receiver and memory), or directly to an online account associated with the athlete, such as a social media account or photo album 136 (FIG. 5). The uploading of the image may occur while the athlete is participating in the sporting event, or after the athlete completes the sporting event. Captured digital images may be delivered to the athlete in a variety of ways, for example only, as a multimedia file sent by SMS, as an attachment to an e-mail, or by direct data upload to a previously provided internet destination or account. Captured digital images may be merged (overlaid) with time and placement information if desired so that the athlete can easily determine at what point during the sporting event the image was taken.

Device 128 may be configured, if desired, as a sensor to detect the approach of an athlete using an electronic identification broadcast from the athlete's wearable device as they approach photo zone 118. Upon detecting the approach of an athlete, device 128 signals the communications hub at photo zone 118 to initiate the image capturing and delivery process described above. Contact details associated with the electronic identification broadcast may be provided by the athlete prior to the sporting event, or after the sporting event.

The foregoing description is by way of example only, and may be varied considerably without departing from the scope of the disclosure. For example only, if desired, the system may be used with a bib number as a secondary identification check. The system may be used with a timing chip if desired as a secondary timing check of the athlete's time. The system may be used without a digital image collection device at the start. In such a situation, the finish time may be determined by assuming the start time of the participant is zero and using the over-all clock time as the finish time of the participant. The system may be configured to digitalise photos or images from printed matter for use in identifying participants in those photos or images.

It will be appreciated that various embodiments described above may be configured for use with non-digital images as needed. As an alternative or supplement to secondary identification methods, an athlete may be identified by post-event searching for a profile image of an athlete on the internet. The post-event profile search may be conducted in situations where a pre-event athlete profile image is not suitable or sufficient for use in identifying the athlete an image captured during the sporting event.

If desired, as an alternative or supplement to obtaining a pre-event profile image to identify an athlete, identification of an athlete may be obtained after the athlete finishes the competition. For example, one or more images may be taken of the athlete after the athlete finishes, with the athlete providing their identification details to a terminal and/or person. This has the advantage of using an image in which the athlete's race-day attire is at least partially included in the photo in case the athlete's face is obscured in one of the timing images.

Non-stationary image collection devices may be utilized to capture images during a sporting event. For example, images may be obtained from an athlete participating in the sporting event using a wearable camera on either the top of the head, or as part of eyewear.

If desired, the system may be configured in a preferred embodiment to search the internet for images of the user in athletic events, and populate the user's personal profile on a web platform with one or more of the images, which may be selectively added with the user's permission. This technique may be used to discover the user's participation in other athletic events and associate the user's participation data (e.g., finishing time, place and/or splits) from such events with a personal athletic event history as part of the personal profile. An example of a web platform having a database for maintaining an athlete's competition data is disclosed in U.S. Pat. No. 8,649,890, filed May 30, 2012, entitled "System and Method for Providing an Athlete with a Performance Profile," the entire disclosure of which is incorporated by reference herein.

The platform may be configured for use with activities other than running, cycling, swimming or multisport. For example only, the platform may be configured for use with sports such as kayaking, crew, hiking, and other sports having a timed component in which a participant is timed.

Information or data normally stored at a physical location may be stored in the Cloud, considerably reducing the hardware needed for memory requirements often associated with large volumes of data.

The features described with respect to one embodiment may be applied to other embodiments, or combined with or interchanged with the features of other embodiments, as appropriate, without departing from the scope of the disclosure.

The present disclosure in one or more preferred forms provides the advantages of timing multiple athletes without the need for bib numbers or timing chips, greatly simplifying the timing of multiple athletes by a timing company as well as making it easier for an athlete to compete without worrying about a timing label or device becoming destroyed or lost during the sporting event. In another preferred form, the present disclosure provides the advantage of identifying images of athletes previously unidentifiable using bib number technology, thereby enhancing the prosects of a photographer company to conduct a sale of the image to the athlete. In a further preferred form, the present disclosure inhibits the ability of athletes to cheat by switching chips or bib numbers.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A system for identifying and timing an athlete during a timed sporting event in which the athlete is participating, said system comprising:
   a camera configured to capture an image of the athlete;
   a media database for storing images captured by said camera; and
   a processor configured to compare a digital profile picture of the athlete stored in said media database prior to commencement of the sporting event with a finish image of the athlete captured during the sporting event, said processor being configured to associate a time with the athlete's performance in the sporting event based on the comparison between the profile picture and the finish image captured during the sporting event, said processor being configured to determine a finish time of the athlete using a comparison of the profile picture and the captured finish image of the athlete, said processor being configured to utilize a secondary identification means for identifying the athlete if the athlete remains unidentified after the comparison between the profile picture and the captured image, wherein the secondary means includes a digital foot recognition mat configured to capture an image of a bottom of an athlete's shoe for comparison with an image stored in said database.

2. The system of claim 1, wherein said processor is configured to associate a placing with the athlete's performance in the sporting event based on the comparison between the profile picture and the image captured during the sporting event.

3. The system of claim 1, wherein the sporting event has a start and a finish, further comprising a second camera, said camera being positioned at the start of the sporting event, said second camera being positioned at the finish of the sporting event.

4. The system of claim 1, wherein said processor is configured to determine a finish time of the athlete without using a bib number wearable by the athlete.

5. The system of claim 1, wherein said processor is configured to use one or more facial features of the athlete to identify the athlete in the images.

6. The system of claim 1, wherein said processor is configured to use one or more facial features of the athlete and at least one non-facial feature of the athlete to identify the athlete in the images.

7. The system of claim 6, wherein the at least one non-facial feature includes a portion of an article of clothing worn by the athlete during the sporting event.

8. The system of claim 1, wherein the digital foot recognition mat is located proximate a finish line of the sporting event.

9. A digital foot recognition system for identifying a user's wear pattern of their shoe as the user approaches a gantry, comprising:
 a foot placement surface leading to the gantry, the gantry being located at one end of the foot placement surface;
 a sensor network configured to capture multiple images of at least a bottom of the user's shoe; and
 a processor configured to identify a particular user's wear pattern based on a comparison of a tread pattern of a particular brand of the shoe, and the wear pattern of the bottom of the shoe.

10. The system of claim 9, further comprising a database in digital communication with said processor, the foot placement surface being a digital foot recognition mat configured to capture the image of the bottom of the shoe for comparison with an image stored in said database.

11. The system of claim 9, further comprising at least one camera for taking a digital image of the user as they are running toward the gantry, and on the foot placement surface.

12. The system of claim 9, further comprising a plurality of cameras for taking a digital image of the user as they are running toward the gantry, and on the foot placement surface.

13. The system of claim 9, wherein the wear pattern of the user's shoe is used as a secondary identification means of identifying the user competing in an athletic event.

14. The system of claim 9, wherein the wear pattern of the user's shoe is used in combination with facial recognition technology to time the user in an athletic event.

15. The system of claim 9, wherein the foot placement surface is configured to accommodate multiple users as they step onto the foot placement surface.

16. The system of claim 9, wherein the gantry includes a first pole and a second pole, said first and second poles each including a camera configured to capture an image of the user as the user approaches the gantry.

* * * * *

UNITED STATES PATENT AND TRADEMARK OFFICE
CERTIFICATE OF CORRECTION

PATENT NO.       : 11,328,161 B2
APPLICATION NO.  : 17/020619
DATED            : May 10, 2022
INVENTOR(S)      : Todd Martin Page 1 of 1

It is certified that error appears in the above-identified patent and that said Letters Patent is hereby corrected as shown below:

On the Title Page

In the item "(*) Notice", please delete "This patent is subject to a terminal disclaimer."

Signed and Sealed this
Twenty-third Day of April, 2024

Katherine Kelly Vidal
*Director of the United States Patent and Trademark Office*